(No Model.)
J. B. LYONS.
STEAM PIPE JOINT PACKING.
No. 332,667. Patented Dec. 15, 1885.
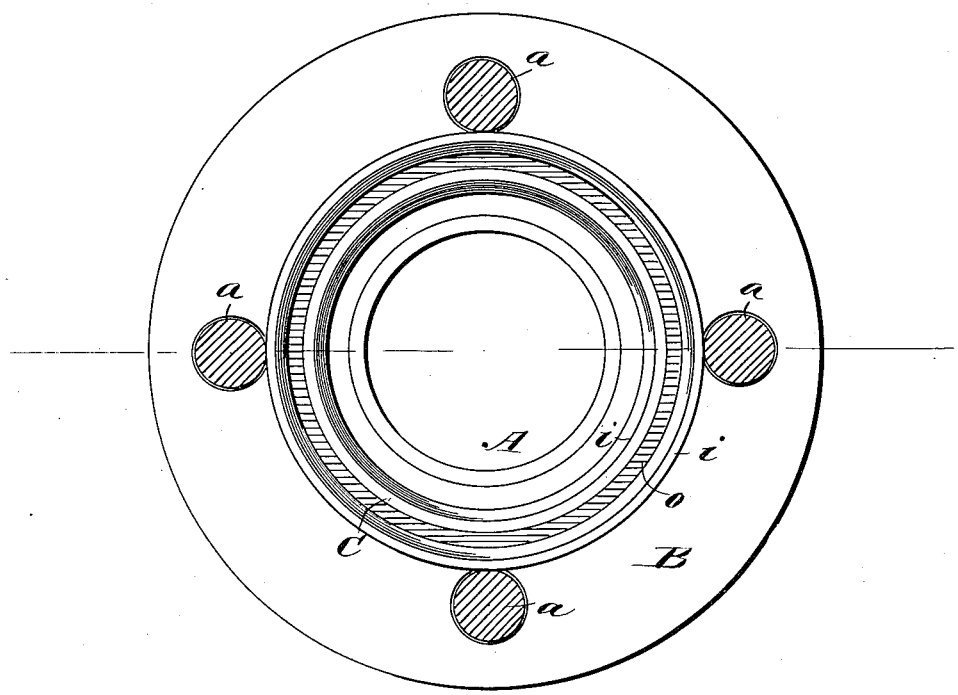
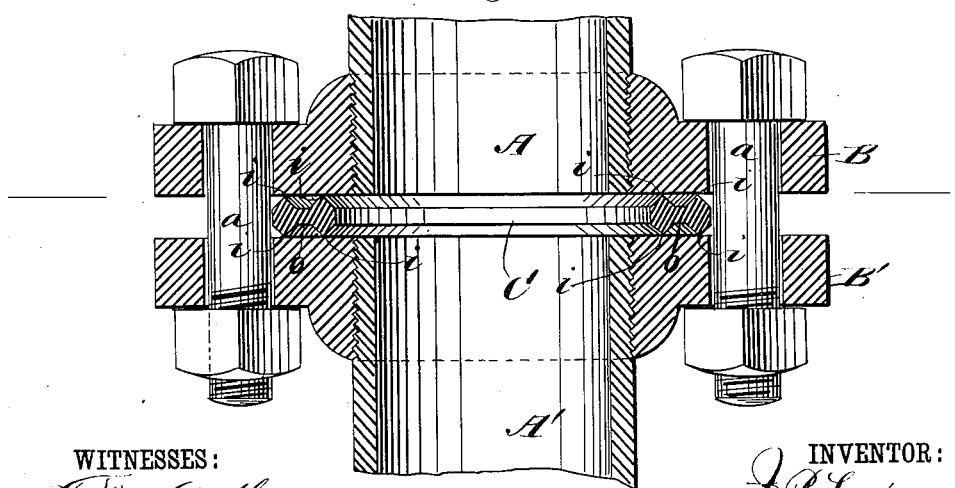
WITNESSES:
INVENTOR:
BY
ATTORNEYS.

UNITED STATES PATENT OFFICE.

JAMES B. LYONS, OF NORWAY, MICHIGAN, ASSIGNOR OF TWO-THIRDS TO FREDERICK L. HIRSCHMANN AND FREDERICK W. RICHARDS, BOTH OF SAME PLACE.

STEAM-PIPE-JOINT PACKING.

SPECIFICATION forming part of Letters Patent No. 332,667, dated December 15, 1885.

Application filed September 7, 1885. Serial No. 176,452. (No model.)

*To all whom it may concern:*

Be it known that I, JAMES B. LYONS, of Norway, in the county of Menominee and State of Michigan, have invented a new and Improved Steam-Pipe Joint, of which the following is a full, clear, and exact description.

My invention relates to the construction of a packing-ring for steam-pipe joints; and it consists of a ring formed of steel or iron, with sharp concentric bearing-ridges upon each face of the ring, and in certain details of construction, as will be hereinafter described, and specifically pointed out in the claims.

Reference is to be had to the accompanying drawings, forming a part of this specification, in which similar letters of reference indicate corresponding parts in both the figures.

Figure 1 is a face view of the packing-ring, which is shown as in position against one of the flanges, and Fig. 2 is a central sectional view of the joint.

Referring to the construction illustrated in the drawings, A A' represent two meeting lengths of pipe, each of which is threaded to engage with an internally-threaded coupling-flange, as B B'. The flanges B B' are united by bolts $a\ a$ in the ordinary manner, but instead of the usual rubber or soft-metal packing-ring, I place a steel or iron ring, C, between the flanges, as best shown in Fig. 2. The novelty of my invention lies in the construction of this ring, which consists, essentially, of two or more concentric ridges, as $i\ i$, which project from each side of a central sustaining-web, $o$. The bearing edges of these ridges $i\ i$ are angular or V-shaped, and all the ridges are of same height. The outer diameter of the ring is such that it will fit closely within the bolts $a\ a$.

Such being the construction of the parts, it will be seen that the packing-ring may be used upon the ordinary form of flanged coupling-piece without the slightest alteration of such coupling-pieces.

The ring is more particularly designed for use where the joint is subjected to a high degree of heat.

I am aware that a packing has been formed of a plate of rubber having a central opening and concentric flattened ridges on its opposite faces, and I claim no such packing as of my invention. This rubber packing could not be used in places where intense heat is applied, and moreover when the parts between which the packing is placed are drawn tightly together, the ridges are flattened out, and the plate is virtually a flat plate.

In my construction the ridges are sharp, and, being preferably of steel, will to a certain extent cut into the flanges between which the packing is held.

Having thus fully described my invention, I claim as new and desire to secure by Letters Patent—

1. A steel or iron packing ring having two or more angular concentric sharp Λ-shaped ridges upon each face, substantially as set forth.

2. The combination, with the pipes A A', coupling-flanges B B, and bolts $a\ a$, of a steel or iron packing-ring, C, formed with sharp Λ-shaped ridges $i\ i$, substantially as described.

J. B. LYONS.

Witnesses:
F. L. HIRSCHMANN,
F. W. RICHARDS.